(12) United States Patent
Wu

(10) Patent No.: US 10,531,359 B2
(45) Date of Patent: Jan. 7, 2020

(54) DEVICE AND METHOD FOR HANDLING A PACKET DATA CONVERGENCE PROTOCOL OPERATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 30 days.

(21) Appl. No.: 16/057,831

(22) Filed: Aug. 8, 2018

(65) Prior Publication Data

US 2019/0053122 A1  Feb. 14, 2019

Related U.S. Application Data

(60) Provisional application No. 62/543,922, filed on Aug. 10, 2017.

(51) Int. Cl.

| | |
|---|---|
| *H04W 40/24* | (2009.01) |
| *H04L 1/18* | (2006.01) |
| *H04L 12/801* | (2013.01) |
| *H04W 80/02* | (2009.01) |
| *H04W 76/19* | (2018.01) |
| *H04W 76/27* | (2018.01) |

(52) U.S. Cl.
CPC .......... *H04W 40/24* (2013.01); *H04L 1/1841* (2013.01); *H04L 47/34* (2013.01); *H04W 76/19* (2018.02); *H04W 76/27* (2018.02); *H04W 80/02* (2013.01)

(58) Field of Classification Search
CPC ...... H04L 1/1841; H04L 47/34; H04W 40/24; H04W 76/19; H04W 80/02
USPC ....................................................... 370/328
See application file for complete search history.

(56) References Cited

U.S. PATENT DOCUMENTS

| | | | |
|---|---|---|---|
| 2010/0074222 | A1 | 3/2010 | Wu |
| 2012/0207040 | A1 | 8/2012 | Comsa |
| 2018/0368018 | A1* | 12/2018 | Kim ...................... H04W 24/10 |

(Continued)

FOREIGN PATENT DOCUMENTS

EP        2 835 925 A1     2/2015

OTHER PUBLICATIONS

3GPP TS 37.340 V0.2.0 (Jun. 2017).

(Continued)

*Primary Examiner* — Robert J Lopata
(74) *Attorney, Agent, or Firm* — Winston Hsu

(57) ABSTRACT

A first communication device for handling a PDCP operation comprises at least one storage device for storing instructions and at least one processing circuit coupled to the at least one storage device. The at least one processing circuit is configured to execute the instructions stored in the at least one storage device. The instructions comprise receiving a first plurality of PDCP Data PDUs associated to a radio bearer (RB), from a second communication device; processing the first plurality of PDCP Data PDUs according to a RX_NEXT, a RX_DELIV and a RX_REORD; updating the RX_NEXT, the RX_DELIV and the RX_REORD; performing a PDCP reestablishment; setting the RX_NEXT, the RX_DELIV and the RX_REORD to a plurality of initial values; receiving a second PDCP Data PDU associated to the RB, from the second communication device; and processing the second PDCP Data PDU according to the RX_NEXT, the RX_DELIV and the RX_REORD.

10 Claims, 4 Drawing Sheets

(56) References Cited

U.S. PATENT DOCUMENTS

2019/0044880 A1* 2/2019 Yi .................... H04L 47/624
2019/0053098 A1* 2/2019 Jo .................... H04W 28/06
2019/0053099 A1* 2/2019 Kim .................. H04L 1/1841

OTHER PUBLICATIONS

Search Report dated on Jan. 2, 2019 for EP application No. 18188519.5, pp. 1-7.
Ericsson, "PDCP reception algorithm", 3GPP TSG-RAN WG2 #98-AH, Tdoc R2-1707154, Jun. 27-29, 2017, Qingdao, P.R. of China, XP051301647, pp. 1-8.
3GPP TS 38.323 V0.2.0 (Aug. 2017), "3rd Generation Partnership Project; Technical Specification Group Radio Access Network; NR; Packet Data Convergence Protocol (PDCP) specification (Release 15)", XP051450225, pp. 1-27.
3GPP TS 37.340 V0.2.1 (Aug. 2017), "3rd Generation Partnership Project; Technical Specification Group Radio Access Network; Evolved Universal Terrestrial Radio Access (E-UTRA) and NR; Multi-connectivity; Stage 2 (Release 15)", XP051336704, pp. 1-43.
Huawei (rapporteur), "Summary of [97bis#12][NR] Bearer type change (Huawei)", 3GPP TSG-RAN WG2 NR Adhoc#2, R2-1707403, Jun. 27-29, 2017, Qingdao, China, XP051301892, pp. 1-27.
3GPP TS 36.323 V14.1.0 (Dec. 2016), "3rd Generation Partnership Project; Technical Specification Group Radio Access Network; Evolved Universal Terrestrial Radio Access (E-UTRA); Packet Data Convergence Protocol (PDCP) specification (Release 14)", XP051230319, pp. 1-39.
ZTE, ZTE Microelectronics, "Consideration on context maintenance", 3GPP TSG-RAN WG2 #97, R2-1701928, Feb. 13-17, 2017, Athens, Greece, XP051212462, pp. 1-6.
3rd Generation Partnership Project; Technical Specification Group Radio Access Network; NR; Packet Data Convergence Protocol (PDCP) specification (Release 15), 3GPP TS 38.323 V0.1.0 (Jun. 2017). pp. 1-25.
Office action dated Mar. 29, 2019 for the Taiwan application No. 107127710, filed Aug. 9, 2018, p. 1-7.

* cited by examiner

DEVICE AND METHOD FOR HANDLING A PACKET DATA CONVERGENCE PROTOCOL OPERATION

CROSS REFERENCE TO RELATED APPLICATIONS

This application claims the benefit of U.S. Provisional Applications No. 62/543,922 filed on Aug. 10, 2017, which is incorporated herein by reference.

BACKGROUND OF THE INVENTION

1. Field of the Invention

The present invention relates to a device and a method used in a wireless communication system, and more particularly, to a device and a method of handling a Packet Data Convergence Protocol (PDCP) operation.

2. Description of the Prior Art

A communication device processes packet data convergence protocol (PDCP) Data Protocol Data Units (PDUs) according to state variables including TX_NEXT, RX_NEXT, RX_DELIV and RX_REORD. When the communication device performs a PDCP reestablishment, how to handle the state variables is still unknown.

SUMMARY OF THE INVENTION

The present invention therefore provides a method for handling a PDCP operation to solve the abovementioned problem.

A method for handling a PDCP operation comprises receiving a first plurality of PDCP Data PDUs associated to a radio bearer (RB), from a second communication device; processing the first plurality of PDCP Data PDUs according to a RX_NEXT, a RX_DELIV and a RX_REORD which are associated to the RB; updating the RX_NEXT, the RX_DELIV and the RX_REORD, when processing the first plurality of PDCP Data PDUs; performing a PDCP reestablishment, after updating the RX_NEXT, the RX_DELIV and the RX_REORD; setting the RX_NEXT, the RX_DELIV and the RX_REORD to a plurality of initial values in response to the PDCP reestablishment; receiving a second PDCP Data PDU associated to the RB, from the second communication device, after the PDCP reestablishment; and processing the second PDCP Data PDU according to the RX_NEXT, the RX_DELIV and the RX_REORD, after setting the RX_NEXT, the RX_DELIV and the RX_REORD to the plurality of initial values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
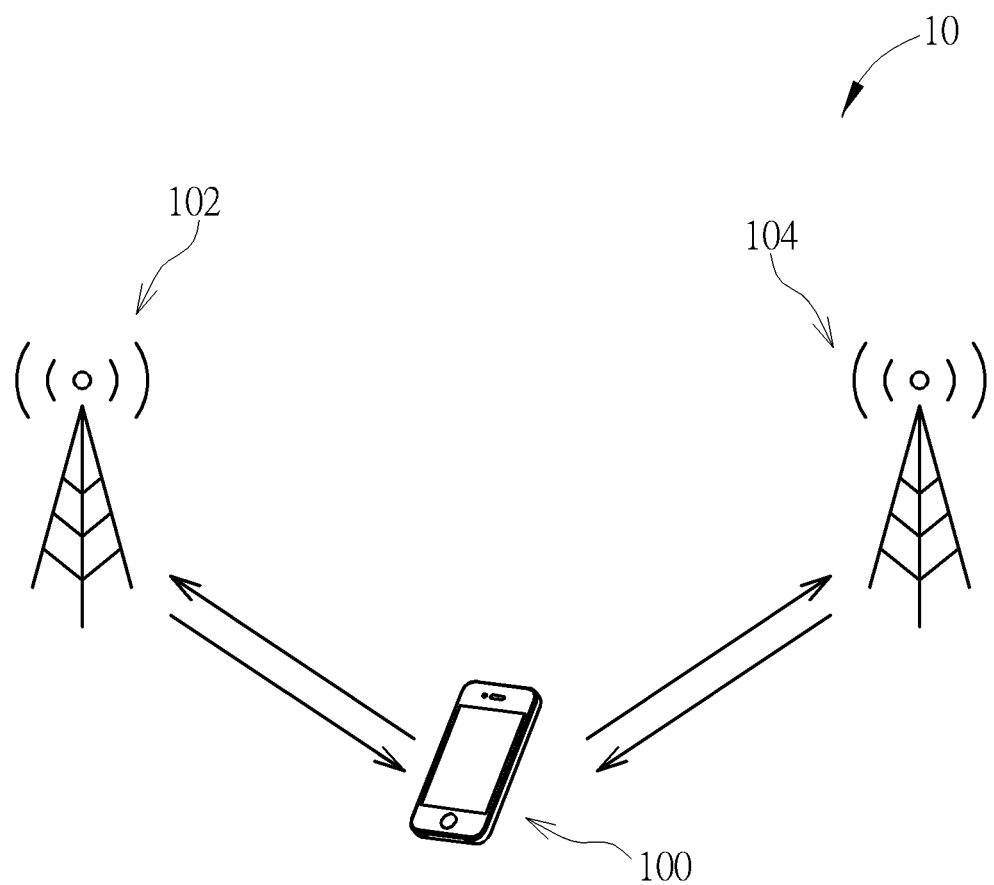
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). For example, the communication device 100 receives packets from the BS 102 at a first carrier frequency and the BS 104 at a second carrier frequency, or the communication device 100 transmits packets to the BS 102 at a first carrier frequency and the BS 104 at a second carrier frequency. In addition, one of the BSs 102 and 104 is a master node (MN) and the other BS is a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
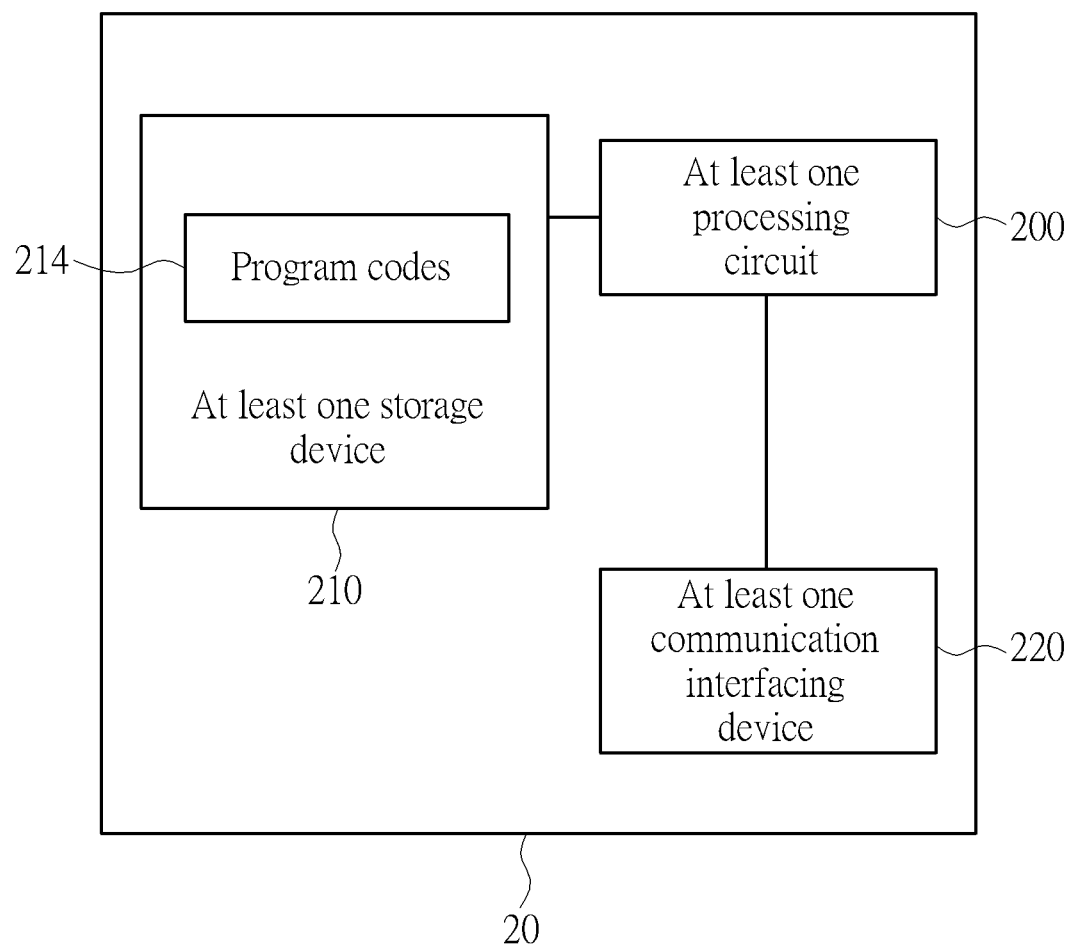
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

A protocol architecture is used for illustrating that the use of a radio bearer (RB) depends on how the RB is established. A RB may be a data RB (DRB) for a user plane data transmission or reception, and a signaling RB (SRB) for a control plane data transmission or reception. A DRB configuration comprises at least one of a DRB identity, a packet data convergence protocol (PDCP) configuration, a radio link control (RLC) configuration, a logical channel identity and a logical channel configuration (e.g., priority or logical channel group). A SRB configuration comprises a SRB identity, the RLC configuration and the logical channel configuration. In the dual connectivity (DC), the RB may belong to one of the three types of RB: a master cell group (MCG) bearer, a secondary cell group (SCG) bearer and a split bearer. The MCG bearer utilizes radio protocols located at the MN, to use the MN radio resources (i.e., time and frequency resources). The SCG bearer utilizes radio protocols located at the SN, to use the SN radio resources. The split bearer may utilize protocols located at both the MN and the SN, to use both the MN resources and the SN resources.

In one example, a communicate device (e.g., the communication device 100 or the BS (s) 102/104) may use the following state variables to communicate PDCP Service Data Units (SDUs) associated to a DRB or a SRB with a communication device.

TX_NEXT, which indicates a COUNT value of a next PDCP SDU to be transmitted. The initial value of TX_NEXT is 0.

RX_NEXT, which indicates a COUNT value of a next PDCP SDU expected to be received. The initial value of RX_NEXT is 0.

RX_DELIV, which indicates a COUNT value of a first PDCP SDU not delivered to upper layers, but still waited for. The initial value of RX_DELIV is 0.

RX_REORD, which indicates a COUNT value following a COUNT value associated with a PDCP Data PDU which triggers/triggered t-Reordering to be started or restarted.

In the following examples, a UE is used for representing the communication device 100 in FIG. 1, to simplify the illustration of the examples.

Figure 3:
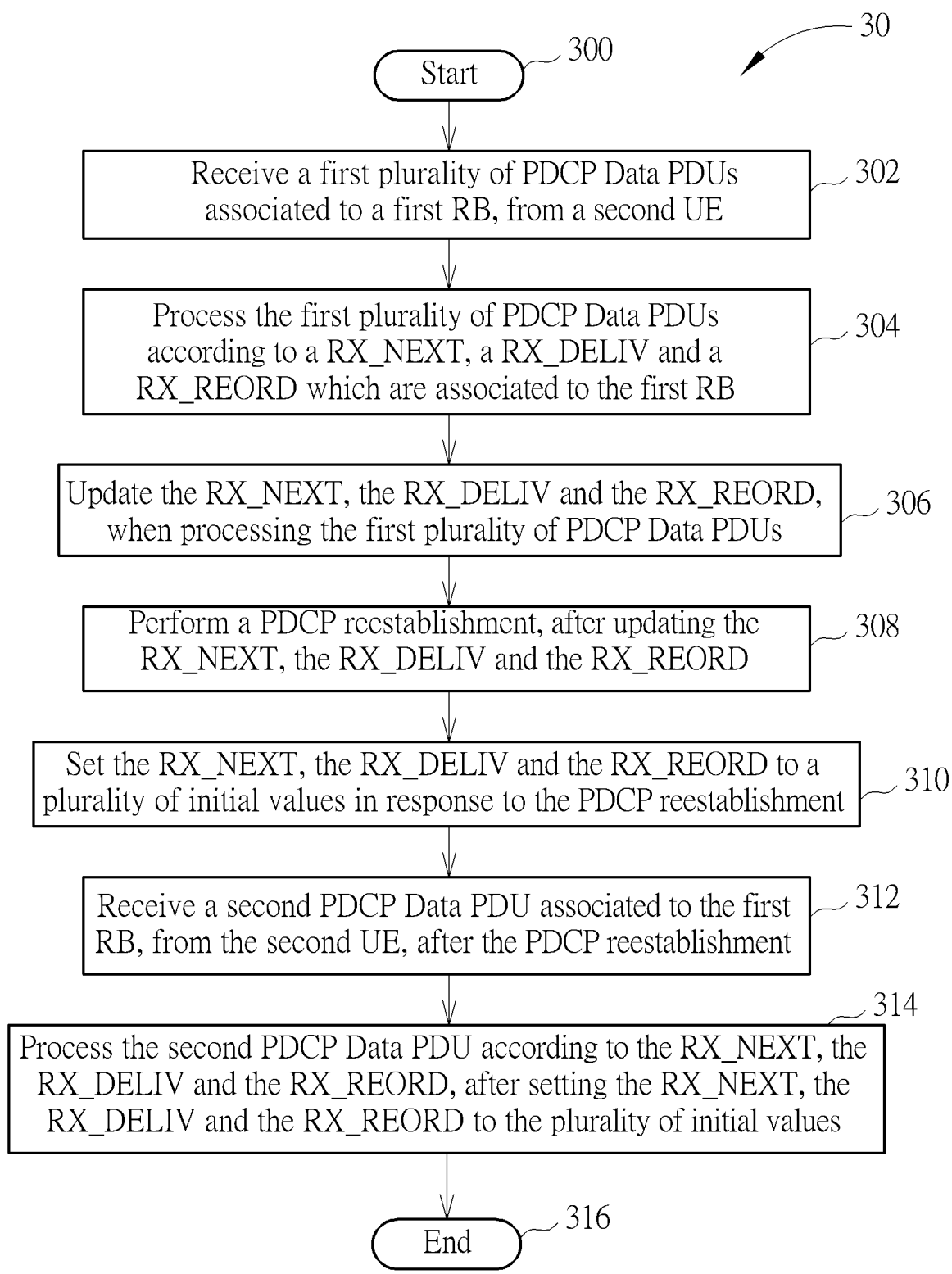
FIG. 3 is a flowchart of a process according to an example of the present invention.

A process 30 in FIG. 3 is utilized in a first UE (e.g., the communication device 100 in FIG. 1) or a BS (e.g., the BS 102 or 104 in FIG. 1) to handle a PDCP operation, and includes the following steps:

Step 300: Start.

Step 302: Receive a first plurality of PDCP Data Protocol Data Units (PDUs) associated to a first RB, from a second UE.

Step 304: Process the first plurality of PDCP Data PDUs according to a RX_NEXT, a RX_DELIV and a RX_REORD which are associated to the first RB.

Step 306: Update the RX_NEXT, the RX_DELIV and the RX_REORD, when processing the first plurality of PDCP Data PDUs.

Step 308: Perform a PDCP reestablishment, after updating the RX_NEXT, the RX_DELIV and the RX_REORD.

Step 310: Set the RX_NEXT, the RX_DELIV and the RX_REORD to a plurality of initial values in response to the PDCP reestablishment.

Step 312: Receive a second PDCP Data PDU associated to the first RB, from the second UE, after the PDCP reestablishment.

Step 314: Process the second PDCP Data PDU according to the RX_NEXT, the RX_DELIV and the RX_REORD, after setting the RX_NEXT, the RX_DELIV and the RX_REORD to the plurality of initial values.

Step 316: End.

Realization of the process 30 is not limited to the above description. The following examples may be applied to the process 30.

In one example, the plurality of initial values are 0. In another example, the plurality of initial values comprise different values. In one example, before performing the PDCP reestablishment, the first UE updates at least one of the RX_NEXT, the RX_DELIV and the RX_REORD to a first plurality of values different from the plurality of initial values due to processing the first plurality of PDCP Data PDUs.

In one example, the first UE processes a plurality of PDCP Service Data Units (SDUs) associated to the first RB according to a TX_NEXT, to transmit the plurality of PDCP SDUs. In one example, the first UE updates the TX_NEXT, when processing the plurality of PDCP SDUs to be transmitted. In one example, before performing the PDCP reestablishment, the first UE updates the TX_NEXT to a second value different from the plurality of initial values due to processing the plurality of PDCP SDUs. In response to the PDCP reestablishment, the first UE sets the TX_NEXT to an initial value (e.g., 0).

In one example, the first RB is a SRB or a DRB. The SRB may be a SRB1, a SRB2 or a SRB3.

In one example, the first UE configures (or establishes) the first RB in a first radio resource control (RRC) procedure, wherein the first RRC procedure is a RRC Connection Establishment procedure, a RRC Connection Resume procedure or a RRC Reconfiguration procedure.

In one example, the first UE performs the PDCP reestablishment, when performing a second RRC procedure, wherein the second RRC procedure is a RRC Connection Resume procedure, a RRC Reconfiguration procedure or a RRC Connection Reestablishment procedure.

Figure 4:
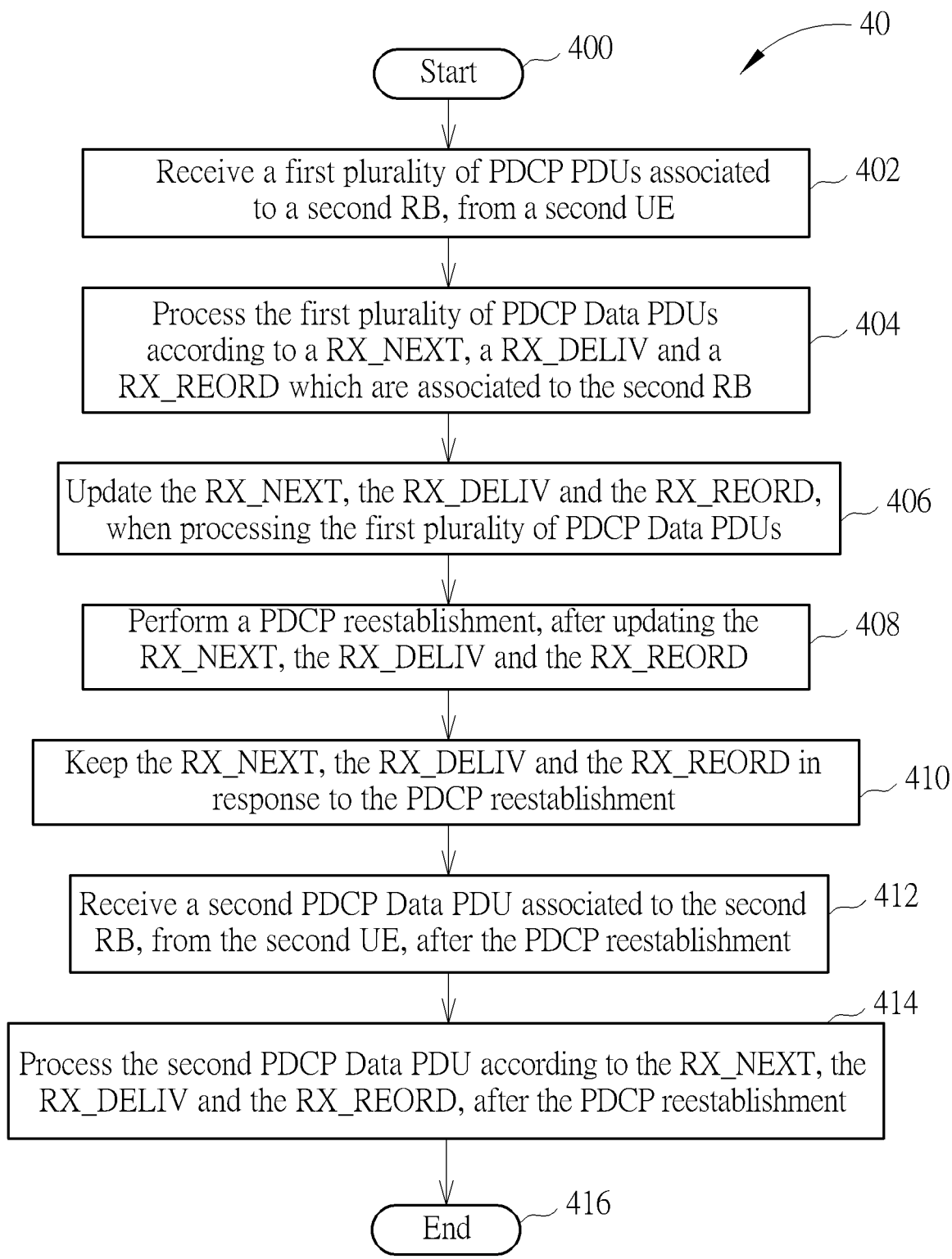
FIG. 4 is a flowchart of a process according to an example of the present invention.

A process 40 in FIG. 4 is utilized in a first UE (e.g., the communication device 100 in FIG. 1) or a BS (e.g., the BS 102 or 104 in FIG. 1) to handle a PDCP operation, and includes the following steps:

Step 400: Start.

Step 402: Receive a first plurality of PDCP PDUs associated to a second RB, from a second UE.

Step 404: Process the first plurality of PDCP Data PDUs according to a RX_NEXT, a RX_DELIV and a RX_REORD which are associated to the second RB.

Step 406: Update the RX_NEXT, the RX_DELIV and the RX_REORD, when processing the first plurality of PDCP Data PDUs.

Step 408: Perform a PDCP reestablishment, after updating the RX_NEXT, the RX_DELIV and the RX_REORD.

Step 410: Keep the RX_NEXT, the RX_DELIV and the RX_REORD in response to the PDCP reestablishment.

Step 412: Receive a second PDCP Data PDU associated to the second RB, from the second UE, after the PDCP reestablishment.

Step 414: Process the second PDCP Data PDU according to the RX_NEXT, the RX_DELIV and the RX_REORD, after the PDCP reestablishment.

Step 416: End.

Realization of the process 40 is not limited to the above description. The following examples may be applied to the process 40.

In one example, before performing the PDCP reestablishment, the first UE updates at least one of the RX_NEXT, the RX_DELIV and the RX_REORD to a first plurality of values (e.g., different from the plurality of initial values in the process 30) due to processing the first plurality of PDCP Data PDUs.

In one example, the first UE processes a plurality of PDCP SDUs associated to the second RB according to a TX_NEXT, to transmit the plurality of PDCP SDUs. In one example, the first UE updates the TX_NEXT, when processing the plurality of PDCP SDUs to be transmitted. In one example, before performing the PDCP reestablishment, the first UE updates the TX_NEXT to a second value (e.g., different from the plurality of initial values in the process 30) due to processing the plurality of PDCP SDUs. In response to the PDCP reestablishment, the first UE keeps (or maintains) the TX_NEXT.

In one example, the second RB is a DRB.

In one example, the first UE configures (or establishes) the second RB in a first RRC procedure, wherein the first RRC procedure is a RRC Connection Resume procedure or a RRC Reconfiguration procedure.

In one example, the first UE performs the PDCP reestablishment, when performing a second RRC procedure, wherein the second RRC procedure is a RRC Connection Resume procedure, a RRC Reconfiguration procedure or a RRC Connection Reestablishment procedure.

The following examples can be applied to the processes 30 and 40.

In one example, the first UE is a UE and the second UE is a BS. In one example, the first UE is a BS and the second UE is a UE. The BS is an evolved Node-B (eNB), a next generation eNB (ng-eNB) or a NR base station (gNB). In one example, the BS is a MN or a SN.

The processes 30 and 40 can be combined to be applied by the first UE. In one example, the first RB is an unacknowledged mode (UM) DRB (i.e., configured to use RLC UM), and the second RB is an acknowledged mode (AM) DRB (e.g., configured to use RLC AM). When the first UE uses the UM DRB and the AM DRB to communicate with the second UE, the first UE applies the process 30 for the UM DRB and applies the process 40 for the AM DRB. In one example, the first RB is a SRB, and the second RB is a DRB (e.g., AM DRB). When the first UE uses the UM DRB and the AM DRB to communicate with the second UE, the first UE applies the process 30 for the SRB and applies the process 40 for the DRB.

In one example, the first UE performs the following operations, to transmit a PDCP SDU (using a PDCP entity associated to a RB):
  associate a COUNT value corresponding to the TX_NEXT to the PDCP SDU;
  perform a header compression (if configured) of the PDCP SDU;
  perform an integrity protection (if configured) and a ciphering (if configured) according to the TX_NEXT;
  set the PDCP SN in a PDCP Data PDU including the PDCP SDU (which is compressed, integrity protected or ciphered) to the TX_NEXT modulo $2^{[pdcp\text{-}SN\text{-}Size]}$;
  increment the TX_NEXT by 1;
  submit the PDCP Data PDU including the PDCP SDU (which is compressed, integrity protected or ciphered) to a lower layer (e.g., a RLC).

The pdcp-SN-Size is configured in a first PDCP configuration and is set to a value below:
  262143, if the PDCP entity is configured for the use of a 18-bit SN;
  4095, if the PDCP entity is configured for the use of a 12-bit SN.

The pdcp-SN-Size configured in a second PDCP configuration is different from the pdcp-SN-Size configured in the first PDCP configuration.

In one example, the TX_NEXT indicates a COUNT value of the next PDCP SDU to be transmitted. In one example, the RX_NEXT indicates a COUNT value of the next PDCP SDU expected to be received. In one example, the RX_DELIV indicates a COUNT value of the last PDCP SDU delivered to an upper layer or indicates a COUNT value of the first PDCP SDU not delivered to the upper layer, but still waited for. In one example, the RX_REORD indicates a COUNT value following a COUNT value associated with a PDCP Data PDU which triggers t-Reordering to be started or restarted.

It should be noted that although the examples above are described to clarify the related operations of corresponding processes, the examples can be combined or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sun up, the present invention provides methods and devices for handling a PDCP operation. The state variables are set to a plurality of initial values or are kept in response to the PDCP reestablishment. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first communication device for handling a Packet Data Convergence Protocol (PDCP) operation, comprising:
  at least one storage device; and
  at least one processing circuit, coupled to the at least one storage device, wherein the at least one storage device stores, and the at least one processing circuit is configured to execute instructions of:
  receiving a first plurality of PDCP Data Protocol Data Units (PDUs) associated to a radio bearer (RB), from a second communication device;
  processing the first plurality of PDCP Data PDUs according to a RX_NEXT, a RX_DELIV and a RX_REORD which are associated to the RB;
  updating the RX_NEXT, the RX_DELIV and the RX_REORD, when processing the first plurality of PDCP Data PDUs;
  performing a PDCP reestablishment, after updating the RX_NEXT, the RX_DELIV and the RX_REORD;
  setting the RX_NEXT, the RX_DELIV and the RX_REORD to a plurality of initial values in response to the PDCP reestablishment;
  receiving a second PDCP Data PDU associated to the RB, from the second communication device, after the PDCP reestablishment; and
  processing the second PDCP Data PDU according to the RX_NEXT, the RX_DELIV and the RX_REORD, after setting the RX_NEXT, the RX_DELIV and the RX_REORD to the plurality of initial values.

2. The first communication device of claim 1, wherein the plurality of initial values are 0.

3. The first communication device of claim 1, wherein the instructions further comprise:
  updating at least one of the RX_NEXT, the RX_DELIV and the RX_REORD to a first plurality of values different from the plurality of initial values, before performing the PDCP reestablishment.

4. The first communication device of claim 1, wherein the instructions further comprise:
  processing a plurality of PDCP Service Data Units (SDUs) associated to the RB according to a TX_NEXT; and
  updating the TX_NEXT, when processing the plurality of PDCP SDUs.

5. The first communication device of claim 4, wherein the instructions further comprise:
  updating the TX_NEXT to a second value different from the plurality of initial values, before performing the PDCP reestablishment.

6. The first communication device of claim 1, wherein the instructions further comprise:
  configuring the RB in a first radio resource control (RRC) procedure, wherein the first RRC procedure is a RRC Connection Establishment procedure, a RRC Connection Resume procedure or a RRC Reconfiguration procedure.

7. The first communication device of claim 1, wherein the instructions further comprise:
  performing the PDCP reestablishment, when performing a second RRC procedure, wherein the second RRC procedure is a RRC Connection Resume procedure, a RRC Reconfiguration procedure or a RRC Connection Reestablishment procedure.

8. A first communication device for handling a Packet Data Convergence Protocol (PDCP) operation, comprising:
  at least one storage device; and
  at least one processing circuit, coupled to the at least one storage device, wherein the at least one storage device stores, and the at least one processing circuit is configured to execute instructions of:
    receiving a first plurality of PDCP Data Protocol Data Units (PDUs) associated to a radio bearer (RB), from a second communication device;
    processing the first plurality of PDCP Data PDUs according to a RX_NEXT, a RX_DELIV and a RX_REORD which are associated to the RB;
    updating the RX_NEXT, the RX_DELIV and the RX_REORD, when processing the first plurality of PDCP Data PDUs;
    performing a PDCP reestablishment, after updating the RX_NEXT, the RX_DELIV and the RX_REORD;
    keeping the RX_NEXT, the RX_DELIV and the RX_REORD in response to the PDCP reestablishment;
    receiving a second PDCP Data PDU associated to the RB, from the second communication device, after the PDCP reestablishment; and
    processing the second PDCP Data PDU according to the RX_NEXT, the RX_DELIV and the RX_REORD, after the PDCP reestablishment.

9. The first communication device of claim 8, wherein the instructions further comprise:
  updating at least one of the RX_NEXT, the RX_DELIV and the RX_REORD to a first plurality of values, before performing the PDCP reestablishment.

10. The first communication device of claim 8, wherein the instructions further comprise:
  processing a plurality of PDCP Service Data Units (SDUs) associated to the RB according to a TX_NEXT; and
  updating the TX_NEXT to a second value before performing the PDCP reestablishment, when processing the plurality of PDCP SDUs.

* * * * *